US009593891B2

(12) United States Patent
Moser et al.

(10) Patent No.: US 9,593,891 B2
(45) Date of Patent: Mar. 14, 2017

(54) HEAT EXCHANGER

(71) Applicant: Behr GmbH & Co. KG, Stuttgart (DE)

(72) Inventors: Michael Moser, Rainau (DE); Caroline Schmid, Stuttgart (DE); Nikolaus Daubitzer, Stuttgart (DE); Holger Schroth, Maulbronn (DE); Heiko Neff, Auenwald (DE); Dominique Raible, Rottenburg (DE); Anton Kierig, Stuttgart (DE); Thomas Schiehlen, Altheim (DE); Stefan Hirsch, Stuttgart (DE); Nic Sautter, Plochingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 248 days.

(21) Appl. No.: 14/038,916

(22) Filed: Sep. 27, 2013

(65) Prior Publication Data

US 2014/0090823 A1 Apr. 3, 2014

(30) Foreign Application Priority Data

Sep. 28, 2012 (DE) .................. 10 2012 217 876
Sep. 28, 2012 (DE) ................... 20 2012 010 990 U
Dec. 13, 2012 (DE) .................. 10 2012 223 125

(51) Int. Cl.
*F28F 3/14* (2006.01)
*F28F 9/02* (2006.01)
(Continued)

(52) U.S. Cl.
CPC .................. *F28F 9/00* (2013.01); *F28F 1/00* (2013.01); *F28F 1/022* (2013.01); *F28F 9/0221* (2013.01);
(Continued)

(58) Field of Classification Search
CPC .......... F28D 1/0316; F28D 1/04; F28D 1/053; F28D 1/05325; F28D 1/05333;
(Continued)

(56) References Cited

U.S. PATENT DOCUMENTS 3,605,882 A * 9/1971 Smith et al. .................. 165/173
3,920,069 A * 11/1975 Mosier .......................... 165/150
(Continued)

FOREIGN PATENT DOCUMENTS

CN 1979083 A 6/2007
CN 102057245 A 5/2011
(Continued)

OTHER PUBLICATIONS

German Search Report, Application No. DE 10 2012 223 125.0, Sep. 23, 2013, 8 pgs.
(Continued)

*Primary Examiner* — Allen Flanigan
*Assistant Examiner* — Jason Thompson
(74) *Attorney, Agent, or Firm* — Paul D. Strain, Esq.; Strain & Strain PLLC

(57) ABSTRACT

The invention relates to a heat exchanger with a first and a second collecting tank, with at least one tube arranged between the two collecting tanks, each having a fluid inlet and a fluid outlet. At least one tube end is in fluid communication with a collecting tank and is connected to the collecting tank via a form-fitting and/or integrally bonded connection, wherein the opening is surrounded by an opening edge.

8 Claims, 2 Drawing Sheets

(51) Int. Cl.

| | | |
|---|---|---|
| *F28F 9/00* | (2006.01) | |
| *F28F 9/04* | (2006.01) | |
| *F28F 9/16* | (2006.01) | |
| *F28F 1/00* | (2006.01) | |
| *F28F 1/02* | (2006.01) | |
| *H01M 10/625* | (2014.01) | |
| *F28D 21/00* | (2006.01) | |

(52) U.S. Cl.
CPC ............... *F28F 9/04* (2013.01); *F28F 9/162* (2013.01); *H01M 10/625* (2015.04); *F28D 2021/0043* (2013.01); *F28F 2275/14* (2013.01)

(58) Field of Classification Search
CPC .... F28D 1/05366; F28D 1/05375; F28D 1/03; F28D 1/0308; F28D 1/0325; F28D 1/0341; F28D 1/035; F28D 1/0366; F28D 1/0383; F28F 3/12; F28F 1/022; F28F 1/40; F28F 3/022; F28F 3/044; F28F 9/0202; F28F 9/0209; F28F 9/012; F28F 9/04; F28F 9/08; F28F 9/06; F28F 9/12; F28F 9/14; F28F 9/162; F28F 9/165; F28F 9/0221
USPC .......................................... 165/170, 173–175
See application file for complete search history.

(56) References Cited

U.S. PATENT DOCUMENTS

| | | | | |
|---|---|---|---|---|
| 4,040,476 A | * | 8/1977 | Telle et al. ....................... | 165/76 |
| 4,586,566 A | * | 5/1986 | Kern et al. ..................... | 165/173 |
| 4,597,436 A | * | 7/1986 | Hagemeister ........... | F28F 1/022 |
| | | | | 165/173 |
| 5,205,354 A | | 4/1993 | Lesage | |
| 6,032,728 A | * | 3/2000 | Ross et al. ..................... | 165/153 |
| 6,289,977 B1 | * | 9/2001 | Claudel et al. ................ | 165/157 |
| 6,619,557 B1 | * | 9/2003 | Bonura et al. ................... | 237/70 |
| 6,993,838 B1 | * | 2/2006 | Staffa et al. ............. | 29/890.052 |
| 7,124,805 B2 | | 10/2006 | Alley | |
| 2002/0057941 A1 | | 5/2002 | Nakajima et al. | |
| 2009/0120625 A1 | * | 5/2009 | Janezich ....................... | 165/173 |
| 2011/0024037 A1 | * | 2/2011 | Becnel .................. | B21D 53/02 |
| | | | | 156/295 |
| 2013/0014915 A1 | | 1/2013 | Hirsch et al. | |

FOREIGN PATENT DOCUMENTS

| | | |
|---|---|---|
| DE | 2 302 770 A | 8/1974 |
| DE | 27 00 182 A1 | 7/1977 |
| DE | 2 112 578 C3 | 9/1980 |
| DE | 37 20 483 A1 | 1/1988 |
| DE | 102 55 978 A1 | 6/2004 |
| DE | 102 58 903 A1 | 8/2004 |
| DE | 10 2007 024 630 A1 | 11/2008 |
| DE | 10 2011 079 091 A1 | 1/2013 |
| FR | 2 504 667 A1 | 10/1982 |
| FR | 2 892 802 A1 | 5/2007 |
| GB | 1 338 273 A | 11/1973 |
| GB | 1 575 021 A | 9/1980 |
| WO | WO 2005/116562 A1 | 12/2005 |
| WO | WO 2012013582 A1 * | 2/2012 |

OTHER PUBLICATIONS

German Search Report, Application No. DE 10 2012 217 876.7, Jul. 9, 2013, 8 pgs.

* cited by examiner

HEAT EXCHANGER

CROSS-REFERENCE TO RELATED PATENT APPLICATIONS

This application is based upon and claims the benefit of priority from prior German Patent Applications No. 10 2012 217 876.7, filed Sept. 28, 2012, No. 20 2012 010 990.1, filed Sep. 28, 2012, and No. 10 2012 223 125.0, filed Dec. 13, 2012, the entire contents of all of which are incorporated herein by reference in their entirety.

TECHNICAL FIELD

The invention relates to a heat exchanger with a first collecting tank and a second collecting tank, with at least one tube arranged between the two collecting tanks, wherein a fluid inlet and a fluid outlet are provided, wherein the tube is accommodated on the end side in in each case one of the collecting tanks in an opening and is in fluid communication with the collecting tank, wherein the tube is connected to the collecting tank via a form-fitting and/or integrally bonded connection, wherein the opening is surrounded by an opening edge.

PRIOR ART

In electric vehicles, energy accumulators are used in order to operate an electric motor. The energy accumulators used in this case are frequently battery packs on a lithium ion basis or nickel-metal hybrid battery packs. As an alternative thereto, use is also made of high-capacity capacitors, what are referred to as super-caps.

In all of the energy accumulators mentioned, a severe buildup of heat occurs during operation, in particular when rapidly charging and discharging the energy accumulators.

However, temperatures of approx. 50° C. and more can damage the energy accumulators and can considerably reduce the service life thereof. Similarly, excessively low temperatures permanently damage the energy accumulators.

In order to maintain the efficiency of the energy accumulators, the temperature thereof therefore has to be actively controlled. The cooling proportions are a significant factor in this case. The cooling can be undertaken, for example, by providing heat exchangers through which the fluid passes. According to solutions in the prior art, the heat exchangers are frequently elements through which the fluid passes and which have one or more fluid ducts, through which a fluid can pass, between two sheetlike cover plates.

All of the cells of the energy accumulators in this case are advantageously kept at a uniform temperature level. Similarly, severe temperature gradients within the cells are intended to be avoided.

A cold fluid can pass through the plates of the heat exchangers for cooling purposes, but, for heating purposes, a hot fluid can also pass therethrough.

In order for the energy efficiency to be as high as possible, a construction which is as weight-optimized as possible is advantageous in particular in electric vehicles.

Solutions which use heat exchangers which are completely manufactured from aluminum are known in the prior art. This is the case, for example, in the applicant's unpublished application with application number 10 2011 079 091.8.

Disadvantages of the solutions according to the prior art include in particular the fact that the heat exchangers are completely constructed from aluminum. Said heat exchangers are significantly heavier than designs made of plastic or made of a mixture of aluminum and plastic. Furthermore, in particular in the case of heat exchangers made of plastic, the connection of the tubes to the collecting tanks is not optimally resolved.

SUMMARY OF THE INVENTION, OBJECT, SOLUTION, ADVANTAGES

It is therefore the object of the present invention to provide a heat exchanger which has an optimized structural configuration of the joining points and adhesive points, wherein the production of said heat exchanger is intended to be less energy- and cost-intensive.

The object of the present invention is achieved by a heat exchanger with the features according to claim 1.

An exemplary embodiment of the invention relates to a heat exchanger with a first collecting tank and a second collecting tank, with at least one tube arranged between the two collecting tanks, wherein a fluid inlet and a fluid outlet are provided, wherein the tube is accommodated on the end side in in each case one of the collecting tanks in an opening and is in fluid communication with the collecting tank, wherein the tube is connected to the collecting tank via a form-fitting and/or integrally bonded connection, wherein the opening is surrounded by an opening edge, wherein at least one collecting tank is of two-part design and has an upper part and a lower part, wherein the tube is insertable into the opening and, on one of the end regions thereof, has a first cutout and/or a first projection, and/or the opening edge has a second cutout and/or a second projection, wherein the first cutout and/or the first projection correspond (s) with the second cutout and/or the second projection in such a manner that a form-fitting connection can be produced between the tube and the collecting tank.

In one exemplary embodiment, the heat exchanger according to the invention serves to control the temperature of an energy accumulator.

By means of an at least two-part collecting tank, form-fitting connections between the tubes and the collecting tanks can be produced more simply. In particular, in the event of intermeshing projections and cutouts. The engaging-behind configurations of tubes and collecting tanks arising because of the projections and cutouts can make it possible, for example, to prevent the tubes from being pulled out of the openings.

Also, by means of the alignment of the projections and cutouts on the tube and on the collecting tank, precise positioning of the tubes relative to the collecting tank can be produced in a simple manner. In addition, an integrally bonded connection, as can be produced, for example, by adhesive bonding, can be assisted by such a form-fitting connection.

In an advantageous refinement of the invention, it can be provided that a separating line between the upper part and the lower part of the collecting tank runs in such a manner that the opening can be divided by separating the upper part from the lower part.

The inserting of the tubes into the collecting tanks can be facilitated by the division of the collecting tank into at least two parts. The separating line between the upper part of the collecting tank and the lower part of the collecting tank advantageously runs here through the opening itself, and therefore the opening is divided by the separation of the upper part from the lower part. As a result, the tube can be inserted into a part of the opening in the upper part or lower part in a particularly simple manner.

According to a further exemplary embodiment according to the invention, it can be provided that the tube has a respective cutout on two opposite sides of one of the end regions thereof, wherein the opening edge has two opposite projections which engage in the cutouts of the tube by insertion of the tube into the opening.

By means of two cutouts on one of the end regions of the tube and projections corresponding thereto in the opening edge of the opening of the collecting tank, a form-fitting connection can be produced between the tube and the collecting tank.

An engaging-behind configuration arises by means of the projections of the opening edge, which engage in the cutouts on the tube. Said engaging-behind configuration prevents the tube from sliding along the main direction of extent thereof out of the collecting tank. The tube is firmly fixed in the opening by means of the engaging-behind configuration by either the upper part or the lower part being placed on top.

A preferred exemplary embodiment of the invention is characterized in that the lower part and/or the upper part have/has, at an impact point between the upper part and the lower part, an at least partially encircling edge which corresponds with a recess in the other part in each case.

An at least partially encircling edge on at least one of the two parts from which the collecting tank is substantially formed serves for simpler positioning of the two parts with respect to each other. In addition, a sealing action emanates from the edge.

In an advantageous embodiment, an additional sealing means can also be arranged on the edge. Said sealing means may be, for example, an elastomer seal which is arranged between the upper part and the lower part and additionally seals the collecting tank at the impact point.

In the event that, for example, two edges running substantially parallel to each other are arranged on one of the parts of the collecting tank, a sealing means can advantageously be placed between the two edges. Possible sealing means here are, for example, elastomer seals or adhesives.

According to a particularly favorable embodiment, it can be provided that the opening edge of the opening in the upper part and/or the lower part has an at least partially encircling groove.

A groove which runs on or in the opening edge can advantageously be used as a reservoir for, for example, an adhesive. Provision can also be made correspondingly to provide the tube with a projection which corresponds to the groove running in the opening edge. A form-fitting connection between the tube and the groove can thereby be produced.

In addition, it can be advantageous if an adhesive is applicable to the opening edge and/or is placeable into the groove of the upper part and/or of the lower part before the tube is inserted.

An adhesive in the groove or on the opening edge can produce an integrally bonded connection in addition to the form-fitting connection of the tube to the collecting tank. There is thereby an overall improvement in the connection. In addition, an additional sealing action can emanate, in particular, from an adhesive.

According to a preferred embodiment, it is advantageous if the upper part and/or the lower part have/has a bore via which an adhesive can be supplied to the respective groove in a final assembled state of the heat exchanger.

An adhesive can be introduced via a bore in the upper part or in the lower part even after the lower part and the upper part have been brought together. This can be advantageous, for example, for manufacturing in a mass manufacturing process.

A further preferred exemplary embodiment is characterized in that the tube at least partially engages behind the opening edge in the final assembled state.

By means of an engaging-behind configuration between the tube and the opening edge, it is ensured that the tube cannot slip out of the collecting tank. Furthermore, forces which would otherwise cause additional loading on the connection can be dissipated via the engaging-behind configuration. In the event of an additional adhesive bond, the latter, for example, can be configured more optimally since it does not have to absorb all of the forces.

Furthermore, it is advantageous if the opening cross section of the opening substantially follows the outer contour of the tube.

A precise fit of the tube in the opening can be achieved by the opening cross section and the outer contour of the tube corresponding as much as possible. This is also advantageous with respect to the necessary sealing off of the fluid.

It is also expedient if the tube has a plurality of flow ducts in the interior thereof.

A tube with a plurality of internal flow ducts is advantageous since the tube thus has greater stability overall. Furthermore, the heat transfer from the fluid, which flows in the tubes, to the environment is furthered.

Advantageous developments of the present invention are described in the dependent claims and the description below of the figures.

BRIEF DESCRIPTION OF THE DRAWINGS

The invention is explained in detail below using exemplary embodiments and with reference to the drawings, in which.

PREFERRED EMBODIMENT OF THE INVENTION

Figure 1:
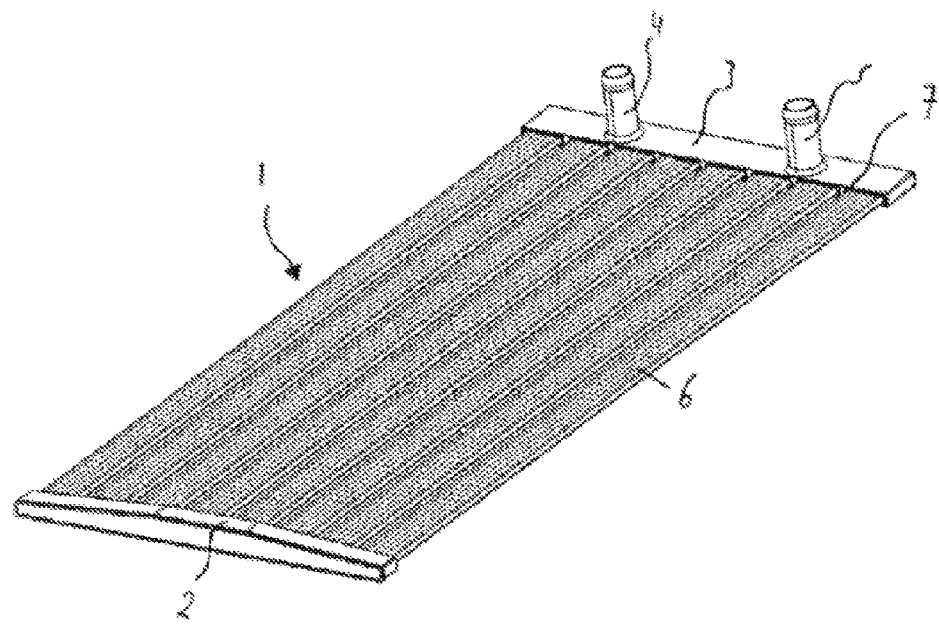
FIG. 1 shows a perspective view of a heat exchanger with a plurality of tubes which are accommodated on the end side in two collecting tanks and are in fluid communication therewith, wherein one of the two collecting tanks has a fluid inlet and a fluid outlet.

FIG. 1 shows a perspective view of a heat exchanger 1. The heat exchanger 1 essentially consists of a multiplicity of tubes 6 and two collecting tanks 2, 3 which each have a plurality of openings 7 into which the tubes 6 are inserted. The tubes 6 are in fluid communication with the collecting tanks 2, 3.

The collecting tank 3 shown in FIG. 1 furthermore has a fluid inlet 4 and a fluid outlet 5. The heat exchanger 1 is in fluid communication with a fluid circuit via the fluid inlet 4 and the fluid outlet 5.

The heat exchanger 1 shown in FIG. 1 has a U-shaped flow-through principle. The fluid enters the collecting tank 3 via the fluid inlet 4, flows through some of the tubes 6 and passes into the collecting tank 2. The fluid is distributed there over the entire width of the collecting tank 2 and flows back via the remaining tubes 6 into the collecting tank 3 and out of the heat exchanger 1 through the fluid outlet 5. In order to make this flow-through principle possible, the interior of the collecting tank 3 has a partition (not shown in FIG. 1) which divides the collecting tank 3 into a left chamber and a right chamber. More precise details with regard to this construction follow in the further figures.

The tubes 6 shown in FIG. 1 essentially have two opposite long sides which are connected by two substantially opposite, short sides. In the case of FIG. 1, said long sides are directed upwards and downwards. Alternatively to the tubes 6 shown here, the use of conventional tubes with round or rectangular cross sections can also be envisaged.

Furthermore, the number of tubes 6 is likewise variable. In the case of a heat exchanger 1 through which the flow passes in a U-shaped manner, at least two tubes 6 have to be provided in order to form at least one forward flow path between the collecting tanks 3 and 2 and a return flow path between the collecting tanks 2 and 3. In the case of a heat exchanger 1 through which the flow passes in an I-shaped manner, one of the collecting tanks 2, 3 in each case would have a fluid inlet 4 and the other would have the fluid outlet 5. In this case, a single tube would be sufficient.

The tubes 6 of the heat exchanger 1 are all arranged in a common plane. That is to say, the upwardly directed, long sides of the tubes lie in a plane with the upwardly directed, long sides of the respectively adjacent tubes 6 of the heat exchanger 1, as a result of which, when tubes 6 are structurally identical, the lower long side of the tubes 6 also lies in a plane. In alternative embodiments, an offsetting of the tubes in different planes can likewise be envisaged.

The collecting tanks 2, 3 can be produced from a thermally readily conductive material, for example a metallic material, or from a plastic or a fiber-reinforced plastic.

The tubes 6 are advantageously produced from a readily thermally conductive material, such as, for example, aluminum. However, the design of the tubes 6 is not restricted to this material. Alternatively, a design of the tubes from a plastic can also be envisaged.

The fluid inlet 4 and the fluid outlet 5 are arranged on the collecting tank 3 in such a manner that they point upwards from the collecting tank 3. This representation is merely an example of a representation of the fluid inlet 4 and of the fluid outlet 5 and should in no way be considered limiting. The arrangement of the fluid inlet and fluid outlet 4, 5 on another side surface of the collecting tank 3 can likewise be envisaged. The arrangement of the fluid inlet and fluid outlet on the opposite collecting tank 2 can also be envisaged, or the distribution of one fluid inlet to one of the two collecting tanks and of the fluid outlet to the other of the collecting tanks in each case can also be envisaged.

By means of such an arrangement of the fluid inlet and fluid outlet, the flow through the heat exchanger would either take place in an I-shaped manner, or, in the event of a plurality of partitions being arranged within the collecting tanks, with multiple deflections.

A particular advantage of a heat exchanger 1, as shown in FIG. 1, is that the overall length of the heat exchanger 1 can be adapted in a simple manner at any time by means of a corresponding variation in the length of the tubes 6. It is therefore ensured that components of differing size can be cooled or heated by the basic constructional shape of the heat exchanger 1 without fundamentally changing the design of the heat exchanger 1.

Figure 2:
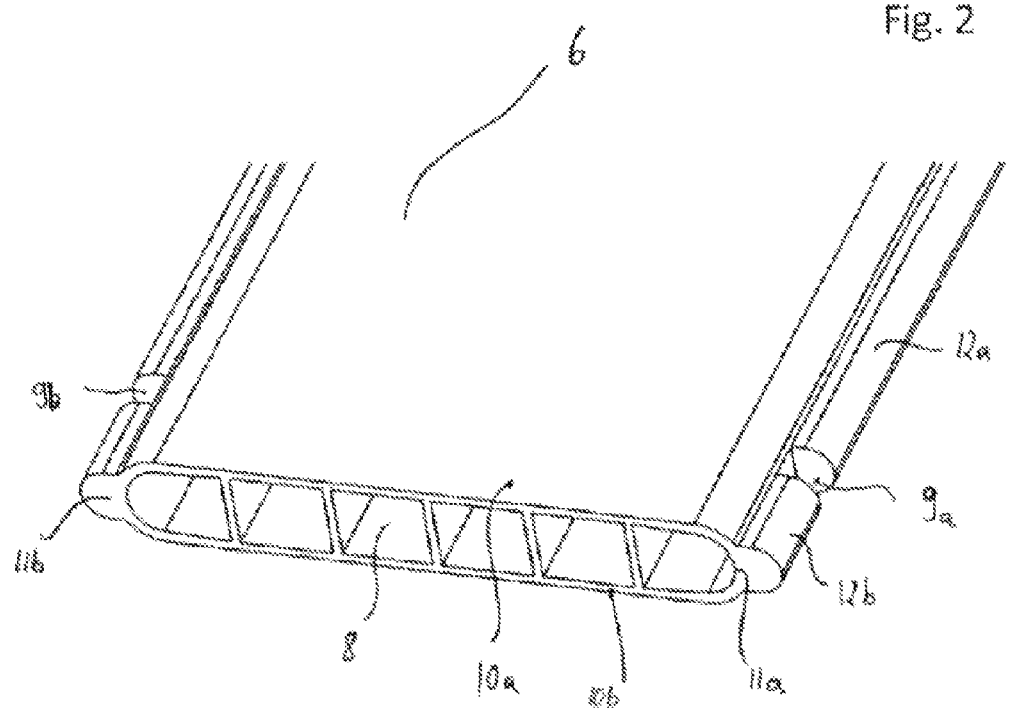
FIG. 2 shows a perspective view of the end region of a tube, wherein the tube has a plurality of internal flow ducts and has a respective cutout on two opposite sides.

FIG. 2 shows a perspective view of a tube 6. The tube 6 shown in FIG. 2 is formed by a flat tube. The interior of the tube 6 has a plurality of flow ducts 8 which run adjacent to one another in parallel along the main direction of extent of the tube 6.

The tube 6 here has two long sides 10*a*, 10*b* which are opposite each other, and two short sides 11*a*, 11*b* which connect the long sides 10*a*, 10*b* to each other and are essentially likewise opposite each other.

The two short sides 11*a*, 11*b* each have a bead which runs along the main direction of extent of the tube 6.

The description of the bead on the short sides 11*a*, 11*b* is restricted below to the description of the bead on the short side 11*a*. The description applies analogously to the short side 11*b*.

The bead is divided by the cutout 9*a* into two regions 12*a*, 12*b*. The section 12*b* of the bead faces the end region of the tube 6. The second bead region 12*a* runs along the rest of the tube 6 after the cutout 9*a* as far as the opposite end region. Depending on the configuration of the tube 6, the end region (not shown in FIG. 2) can also have one or more cutouts similar to the cutouts 9*a* and 9*b* shown in FIG. 2.

The tube 6 is advantageously formed from a readily heat-conductive material, and therefore the transfer of heat from the fluid, which can flow in the interior of the pipe, to the environment is furthered as much as possible. The use of a plastic is particularly advantageous, since plastics are particularly lightweight, thus enabling the overall weight of the heat exchanger to be reduced. A form-fitting connection to the collecting tank is advantageous particularly for plastics which are weldable or solderable with difficulty, if at all.

The representation of the tube 6 that is shown in FIG. 2 is by way of example and does not have any limiting character. In alternative embodiments, for example, a differing tube shape can be envisaged, or else a differing configuration, for example, of the short sides of the tube. Instead of a bead, the material thickness of the second wall can also be increased to an extent such that it can have a cutout.

Figure 3:
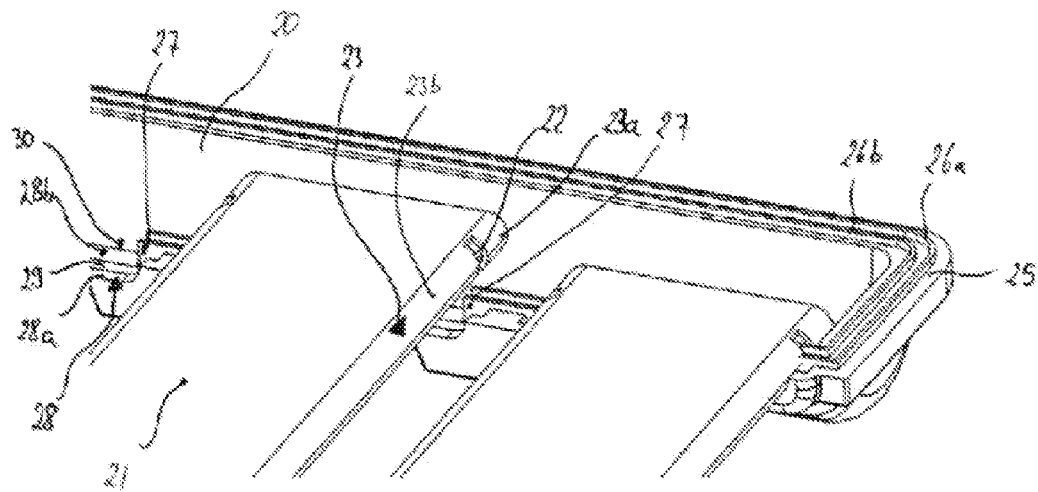
FIG. 3 shows a perspective view of a lower part of a collecting tank with an inserted tube and a tube positioned over one of the openings.

FIG. 3 shows a perspective view of an upper part or lower part 20 of a collecting tank. The collecting tank shown in FIG. 3 is of at least two-part design, wherein only one of said two parts of the collecting tank is shown in FIG. 3. For the further description of FIGS. 3 and 4, the component which is provided with the reference number 20 always denotes the lower part 20 of the collecting tank. The associated upper part is not illustrated in FIGS. 3 and 4. The explanations can also apply analogously to the upper part of the collecting tank.

The lower part 20, at its upwardly directed impact point 25, at which the lower part 20 comes into contact with the upper part in the final assembled state, has a first at least partially encircling edge 26*a* and a second at least partially encircling edge 26*b*. Said edges 26*a*, 26*b* protrude beyond that surface of the impact point 25 which protrudes upwards. They serve to position the upper part with respect to the lower part 20, or vice versa. The other part in each case has corresponding recesses for receiving said edges 26*a*, 26*b*, the recesses permitting reliable positioning of the parts with respect to each other.

A channel is produced between the edges 26*a*, 26*b*. It is possible to insert, for example, a sealing element, such as, for example, an elastomer seal, into said channel. Said elastomer seal assists the sealing between the lower part 20 and the upper part. The upper part could advantageously have a recess which can both receive the edges 26*a*, 26*b* and an inserted elastomer seal.

A number of edges differing from the number shown is also possible both on the lower part 20 and on the upper part.

The other part in each case of the collecting tank advantageously has corresponding recesses which can receive the edges arranged on the other part in each case in a precisely fitting manner.

A first tube 21 is inserted into an opening 30 in the lower part 20 of the collecting tank in FIG. 3. A second tube 21 is positioned over a further opening 30 and represents the state shortly before the tube 21 is inserted into the opening 30.

The tubes 21 here each have a cutout 22 on one of their short sides 23. Said cutout 22 divides the short side in each case into a first region 23a and a second region 23b. Similarly to the bead 12a, 12b in FIG. 2, the region 23a of the short side 23 forms the region facing the end region of the tube 21 in FIG. 3. The region 23b denotes the rest of the short side 23 of the tube 21, which side extends along the main direction of extent of the tube 21.

The openings 30 in the lower part 20 of the collecting tank have an opening edge 28 which in turn has a groove 29. Said groove 29 divides the opening edge 28 into at least two regions. Furthermore, projections 27 project into the openings 30.

The projections 27 here are configured in such a manner that they correspond to the cutouts 22 on the short sides of the tubes 21. The tubes 21 can be inserted into the openings 30 from above, as a result of which the projections come into engagement with the cutouts 22 and a form-fitting connection is produced between the tubes 21 and the lower part 20 of the collecting tank.

That region 23a of the short side 23 which faces the end region of the tube 21 engages here behind the projection 27 and thus prevents the tube from sliding out of the lower part 20 of the collecting tank. The tube 21 here comes to lie by means of the outer surfaces thereof on the opening edge 28. In this case, the tube 21 also at least partially covers the groove 29 in the assembled state.

The projections 27 shown in FIG. 3 are formed by the encircling edges 26a, 26b which run on the upper impact point 25 of the lower part 20. Said edges 26a, 26b are interrupted along a section merely in the region of the openings 30 such that the tubes 21 can be inserted into the openings 30.

In order further to increase the connection between the tubes 21 and the lower part 20, it is possible, for example, for an adhesive to be introduced into the groove 29 before the tubes 21 are inserted, said adhesive creating an integrally bonded connection in addition to the form-fitting connection between the tubes 21 and the lower part 20. In addition to an integrally bonded connection, an adhesive also results in sealing between the tube 21 and the lower part 20.

Provision can likewise be made to introduce an adhesive into the region between the edges 26a, 26b. By this means, the connection of the lower part to the upper part (not shown) can be improved. In addition, a sealing of the collecting tank along its impact point 25 can also be produced by means of an adhesive.

In the final assembled state of the tubes 21, the groove 29 runs not only along the long side but also along the short side 23 of the tube 21. An adhesive introduced into the groove 29 can therefore completely surround the tube 21.

The upper part (not shown) advantageously substantially coincides with the construction of the lower part 20. This applies in particular to the configuration of the openings 30 which receive the tubes 21. Accordingly, the groove 29 running as far as the impact point 25 is continued without interruption by the upper part (not shown), and therefore in the final assembled collecting tank, the groove runs completely around the tube 21. A substantial difference between the lower part 20 and the upper part is that the upper part advantageously does not have any edges 26a, 26b, but rather recesses matching said edges.

The lower part 20 and the upper part can be connected by a multiplicity of connecting methods. In addition to adhesives, use can also be made of mechanical connections, for example screw connections or wedged connections. Furthermore, use can be made of thermal joining methods, such as, for example, soldering or welding. The list is not definitive and does not have a restricting character.

Figure 4:
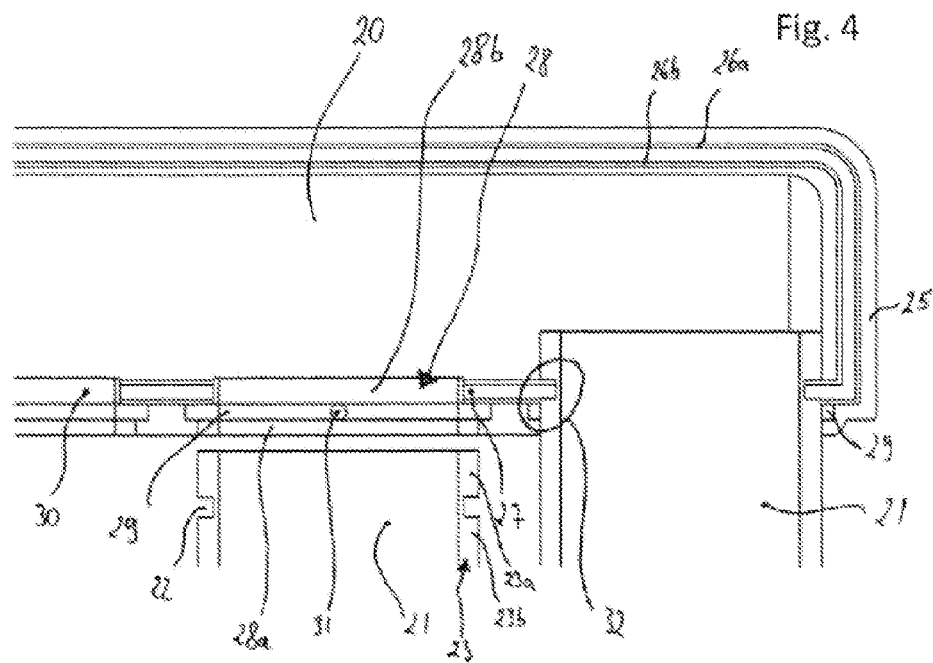
FIG. 4 shows a top view of the lower part of the collecting tank, shown in FIG. 3, together with the described tubes.

FIG. 4 shows a top view of the arrangement, which is shown in FIG. 3, of the lower part 20 and two tubes 21. In FIG. 4 which shows a top view of the impact point 25, the channel between the edges 26a and 26b can be seen in particular. Said channel is interrupted merely in the region of the openings 30 in order to be able to receive the tubes 21 there.

The groove 29 which is arranged in the region of the opening 30 can also be seen in the top view. In particular, FIG. 4 shows that the groove 29 protrudes on the right and left over the opening edge 28 which substantially forms the receiving region for the tube 21. As already described in FIG. 3, this makes it possible for a groove 29 which runs completely around the tube 21 and permits an encircling adhesive bond between the lower part 20, the upper part and the tubes 21, to be produced by the upper part, which is substantially adapted to the lower part 20, being placed thereon.

Furthermore, the groove 29 has a bore 31 which permits an adhesive to be poured into the groove 29 after the final assembly of the collecting tank. The bore here passes from the groove 29 through the outer surface of the lower part 20. After the tubes 21 are inserted into the lower part 20 and the upper part is placed thereon, the groove region 29 can be filled with an adhesive. The upper part (not shown) advantageously likewise has a bore in the groove region, and therefore either air which is displaced by the adhesive can escape from said second bore, or an adhesive can be injected from both sides simultaneously.

The opening edge 28 of the opening 30, which opening edge is divided by the groove 29 into two regions 28a, 28b, substantially constitutes the contact surface for the outer side of the flat tube 21. Starting from the interior of the lower part 20, the region 28b substantially imitates the outer shape of the tube 21 in the region in which the tube 21 has the two cutouts 22. The region 28b is tapered by the projections 27 which project into the region 28b. The region 28b is, as a result, narrower than the region 28a or the groove 29.

The region 28b is outwardly adjoined by the groove 29. The groove 29 is wider than the region 28a, which, in turn, is wider than the region 28b. The tube 21 comes to lie over the groove 29. The groove 29 protrudes here on the right and left over the tube 21.

The adjoining region 28a substantially imitates the outer shape of the tube 21 in the region in which the tube 21 does not have any cutouts.

The configuration of the opening edge 28 and of the groove 29 are by way of example. Differing configurations of the opening edge 28 and of the groove 29 can also be envisaged. For example, the opening edge can also be of single-part design, with a groove adjoining the opening edge. Alternatively, an embodiment without an additional groove can be provided. An adhesive would then be applied directly to the opening edge itself.

In the connecting region 32, which represents the engagement of the projection 27 in a cutout 22 of the tube 21, it can be seen that, firstly, the groove 29 in the top view protrudes laterally over the tube 21, but also that the projection 27 engages in a precisely fitting manner in the cutout 22 of the tube 21. That region 23a of the short side 23 which faces the end region of the tube 21 engages here behind the projection 27 in the interior of the lower part 20, thus preventing the tubes 21 from being pulled out.

The embodiments of the tubes that are shown in FIGS. 2 to 4 and the embodiment of the collecting tank should be understood merely as being by way of example. In particular, the design of the cutouts and of the projections on the tubes and the collecting tanks serve merely to illustrate the connecting principle. In alternative embodiments, it can likewise be envisaged that the tubes have projections and the collecting tanks have corresponding cutouts which correspond to the projections of the tubes.

Similarly, it can be provided that one of the tubes has a projection on one of its sides and a cutout on the opposite side, and the collecting tank has corresponding projections and receptacles which correspond to said tube. It is essential that the opening in the collecting tank coincides with the geometry of the end region of the tube in such a manner that a secure fit of the tube in the opening of the collecting tank is ensured.

In addition to the form-fitting connection, integrally bonded connections can be produced by the introduction of adhesives. In order to connect the lower part and the upper part of a collecting tank, use can be made of adhesives which, firstly, connect the lower part to the upper part and, in addition, produce sealing between the upper part and the lower part.

The embodiments shown do not have any limiting character and serve merely to illustrate the inventive concept.

The invention claimed is:

1. A heat exchanger comprising:
a first collecting tank and a second collecting tank,
at least one tube arranged between the first collecting tank and the second collecting tank
a fluid inlet and a fluid outlet arranged on the first collecting tank or the second collecting tank, wherein end regions of the at least one tube are accommodated in openings in the first collecting tank and the second collecting tank, wherein the at least one tube is in fluid communication with the first collecting tank and the second collecting tank, wherein the at least one tube is connected to the first collecting tank and the second collecting tank, wherein the opening is surrounded by an opening edge,
wherein at least one of the first collecting tank or the second collecting tank is of two-part design and comprises an upper part and a lower part, wherein the at least one tube is insertable into the opening of said first collecting tank and said second collecting tank, wherein one of the end regions of the at least one tube comprises a first cutout and the opening edge of said first collecting tank or said second collecting tank comprises a first projection corresponding to the first cutout, wherein the first cutout and first projection engage to produce a form-fitting connection between the at least one tube and said first collecting tank or said second collecting tank,
wherein the lower part comprises a first encircling edge and a second encircling edge, wherein the first and second encircling edges are arranged on the perimeter of the upper part or lower part and bound a channel comprising an adhesive arranged between the first and second encircling edges, wherein the upper part comprises a first recess and a second recess which partially engage the first encircling edge and the second encircling edge,
wherein the first projection is formed as an end portion of the first encircling edge, the second encircling edge, and the channel,
wherein the opening edge of the opening in the upper part or the lower part has an at least partially encircling groove,
wherein the upper part or the lower part further comprises a bore in fluid connection with the at least partially encircling groove, wherein the bore, the at least partially encircling groove, and the tube bound a space comprising an adhesive in which said space terminates at an opening in said bore.

2. The heat exchanger according to claim 1, wherein a separating line between the upper part and the lower part of the first collecting tank or the second collecting tank runs in such a manner that the opening can be divided by separating the upper part from the lower part.

3. The heat exchanger according to claim 1, wherein the at least one tube has a respective cutout on two opposite sides of one of the end regions thereof, wherein the opening edge has two opposite projections which engage in the cutouts of the tube by insertion of the tube into the opening.

4. The heat exchanger according to claim 1, wherein the lower part or the upper part has, at an impact point between the upper part and the lower part, an at least partially encircling edge which corresponds with a recess in the other part in each case.

5. The heat exchanger according to claim 1, wherein an adhesive is applicable to the opening edge or is placeable into a groove of the upper part or of the lower part before the tube is inserted.

6. The heat exchanger according to claim 1, wherein the tube at least partially engages behind the opening edge in the final assembled state.

7. The heat exchanger according to claim 1, wherein an opening cross section of the opening in the first collecting tank or the second collecting tank substantially follows the outer contour of the tube.

8. The heat exchanger according to claim 1, wherein the tube has a plurality of flow ducts in the interior thereof.

* * * * *